(12) United States Patent
Tamada et al.

(10) Patent No.: US 9,399,319 B2
(45) Date of Patent: Jul. 26, 2016

(54) BLOW MOLDED ARTICLE WITH SURFACE SKIN AND METHOD FOR PRODUCTION THEREOF

(75) Inventors: Teruo Tamada, Yokohama (JP); Masaaki Onodera, Ashikaga (JP)

(73) Assignee: Kyoraku Co., Ltd., Tokyo (JP)

( * ) Notice: Subject to any disclaimer, the term of this patent is extended or adjusted under 35 U.S.C. 154(b) by 1892 days.

(21) Appl. No.: 11/577,504

(22) PCT Filed: Oct. 19, 2005

(86) PCT No.: PCT/JP2005/019636
§ 371 (c)(1),
(2), (4) Date: Jan. 17, 2008

(87) PCT Pub. No.: WO2006/043703
PCT Pub. Date: Apr. 27, 2006

(65) Prior Publication Data
US 2008/0261016 A1    Oct. 23, 2008

(30) Foreign Application Priority Data
Oct. 19, 2004   (JP) .................................. 2004-304404

(51) Int. Cl.
*B29C 49/24*    (2006.01)
*B60R 5/04*     (2006.01)
(Continued)

(52) U.S. Cl.
CPC ................. *B29C 49/24* (2013.01); *B60R 5/044* (2013.01); *B60R 13/01* (2013.01); *B60R 13/02* (2013.01);
(Continued)

(58) Field of Classification Search
USPC .................. 264/46.4, 54, 51, 45.1, 45.4, 46.5
See application file for complete search history.

(56) References Cited

U.S. PATENT DOCUMENTS 6,432,525 B1 *  8/2002  Gokuraku et al. ......... 428/318.6
6,706,223 B1    3/2004  Anderson et al.
(Continued)

FOREIGN PATENT DOCUMENTS

DE    19949798 A1    6/2000
EP    1166995 A      1/2002
(Continued)

OTHER PUBLICATIONS

PCT Search Report dated Nov. 10, 2005 of Patent Application No. PCT/JP2005/019636 filed Oct. 19, 2005.
(Continued)

*Primary Examiner* — Christina Johnson
*Assistant Examiner* — Xue Liu
(74) *Attorney, Agent, or Firm* — Maine Cernota & Rardin

(57) ABSTRACT

Provided are a blow molded article with a surface skin, which allows the formation of a blow molded article having a desired expansion ratio and retains a required expansion ratio from the time of extruding and is free from the generation of a sink mark or a warp in a portion where the surface wall and the back wall thereof has been welded and allows the production of a blow molded article with a lightweight and highly rigid surface skin; and a method for producing the blow molded article. A panel (1) with a surface skin, which is a blow molded article with a surface skin, has a body (5) in the form of a plate having a surface wall (2) and a back wall (3), both comprising a thermoplastic plastic, and a surface skin material (6) which is integrally pasted on the surface wall (2). The body (5) in the form of a plate is in an expanded state and comprises cells having an average particle diameter of 300 μm or less.

4 Claims, 8 Drawing Sheets

(51) Int. Cl.
 *B60R 13/01* (2006.01)
 *B60R 13/02* (2006.01)
 *C08L 23/12* (2006.01)
 B29C 49/04 (2006.01)
 B29L 31/30 (2006.01)

(52) U.S. Cl.
 CPC ............... *C08L 23/12* (2013.01); *B29C 49/04* (2013.01); *B29C 2049/2402* (2013.01); *B29L 2031/3005* (2013.01); *C08L 2203/14* (2013.01); *C08L 2205/02* (2013.01); *Y10T 428/249975* (2015.04)

(56) References Cited

U.S. PATENT DOCUMENTS

2004/0062885 A1* 4/2004 Imanari et al. ............... 428/34.1
2004/0166269 A1* 8/2004 Imanari et al. ............... 428/36.5

FOREIGN PATENT DOCUMENTS

| | | |
|---|---|---|
| JP | 62-053265 A | 3/1987 |
| JP | H9-174672 A | 7/1997 |
| JP | H10-016028 A | 1/1998 |
| JP | 10-029466 | 2/1998 |
| JP | 10-235720 A | 9/1998 |
| JP | 11-129322 A | 5/1999 |
| JP | 3070960 B2 | 5/2000 |
| JP | 2001-097132 | 4/2001 |
| JP | 2002-028997 | 1/2002 |
| JP | 2003-291207 A | 10/2003 |
| JP | 2004-082332 | 3/2004 |
| JP | 2004-122488 A | 4/2004 |
| WO | 99/28111 A1 | 6/1999 |

OTHER PUBLICATIONS

"Plastics—Determination of Tensile Properties—Part 1: General Principles", Japanese Industrial Standard, 1994.
"Methods for Determining the Density and Specific Gravity of Plastics", Japanese Industrial Standard, 1980.
"Plastics—Determination of Flexural Properties", Japanese Industrial Standard, 1994.
"Testing Method for Melt Flow Rate of Thermoplastics", Japanese Industrial Standard, 1976.

\* cited by examiner

BLOW MOLDED ARTICLE WITH SURFACE SKIN AND METHOD FOR PRODUCTION THEREOF

RELATED APPLICATIONS

This application is a US National Phase of PCT Application No. PCT/JP2005/019636, filed 19 Oct. 2005, which claims priority to Japanese Patent Application No. JP2004-304404, filed 19 Oct. 2004. Each of these applications is herein incorporated in its entirety by reference.

TECHNICAL FIELD

The present invention relates to a plate-shaped blow molded article with a surface skin, one embodiment of such an article having a front wall and a back wall in a foamed state produced by blow molding of a thermoplastic resin, and having a surface skin material attached on the outer surface of at least one of the walls, and also relates to a method for producing the blow molded article.

The plate-shaped blow molded article with a surface skin according to various embodiments of the present invention may be used for, for example, interior automotive trims such as cargo floor panels (lid panels or luggage boards of automobile baggage compartments) or rear parcel shelves, and structural panel-shaped articles such as interior finishing wall partitions and doors.

BACKGROUND

Japanese Patent Application Laid-Open (JP-A) No. 2004-82332 describes a method for forming a foam molded article with a surface skin layer from a multilayered parison comprising a resin layer and a foamed layer, and also describes a method for integrally thermocompression bonding a fiber surface skin material with a mass per unit area of 100 to 500 g/m$^2$ integrally to a surface skin layer. JP-A-2001-97132 describes a package tray (rear parcel shelf) for vehicles, comprising a board in a foamed state molded with foaming injection molding. JP-A-2002-28997 describes a foam molded article with a surface skin formed by foaming injection molding. JP-A-10-29466 describes a method for forming a luggage box or a lid thereof for integral lamination of a surface skin material by charging foaming particles into a mold, and then heating with steam or the like to fuse the particles together.

In order to integrally attach a surface skin material to the surface of a foam molded article in blow molding, it is necessary to mold a thermoplastic resin currently maintained in a molten state at a temperature not less than a fixed temperature. However, when the temperature of the thermoplastic resin in molding is raised to a temperature sufficient for integral attachment of the surface skin material, the bubble cells will be broken, causing a rapid drop in a expansion ratio. Therefore, a blow molded article having a surface skin with lightweight and high rigidity cannot be obtained.

In addition, in order to realize a lighter weight, simple increase in the average particle diameter of the bubble cells and in expansion ratio deteriorates elongation property of the thermoplastic resin used. Since the resin is especially extended in a portion of the integrally formed reinforcing rib, there will be caused decrease in moldability, such as occurrence of a rupture, and simultaneously decrease in rigidity of the plate-shaped body as a base material, leading to occurrence of a large distortion to a load.

SUMMARY OF THE INVENTION

Therefore, an object of one embodiment of the present invention it to provide a blow molded article with a surface skin by forming a plate-shaped body of a blow molded article with a surface skin in a foamed state comprising bubble cells with an average particle diameter not more than 300 μm, while reducing rupture of bubble cells even when a thermoplastic resin is maintained in a molten state at a temperature sufficient for integral attachment of a surface skin material in blow molding, and while maintaining a required expansion ratio from the extruding process. Furthermore, another object of one embodiment of the present invention is to obtain a blow molded article with a surface skin, the blow molded article having a flexural strength causing no large distortion and having a lightweight and high rigidity, by blending two or more kinds of polyolefin resins having different melt flow rates so as to give the thermoplastic resin forming the plate-shaped body a tensile modulus not less than 550 MPa to realize a desired foamed state, thereby improving the moldability, and by using a reinforcing rib or a reinforcing core with a plate-shaped body in combination.

In order to attain the above-described objectives, one embodiment of the present invention provides a blow molded article with a surface skin. A blow molded article with a surface skin according to another such an embodiment comprising a plate-shaped body having a front wall and a back wall composed of a thermoplastic resin, and a surface skin material integrally attached on at least one wall of the front wall and the back wall, the plate-shaped body being in a foamed state having bubble cells with an average particle diameter not more than 300 μm.

A blow molded article with a surface skin according to a further such an embodiment wherein, the blow molded article has a flexural strength giving an amount of distortion not more than 25 mm when a load of 30 kg is applied to an area equal to that of a circle with a diameter of 50 mm in an approximate center in a longitudinal direction of the plate-shaped body.

A blow molded article with a surface skin according to yet another such an embodiment wherein, a hollow section is formed at least in one part between the front wall and the back wall that constitute the plate-shaped body.

A blow molded article with a surface skin according to a yet further such an embodiment wherein, a reinforcing core is inserted in the hollow section formed between the front wall and the back wall.

A blow molded article with a surface skin according to still another such an embodiment wherein, the front wall and the back wall that constitute the plate-shaped body have a reinforcing rib at least in one part integrally welded thereto.

A blow molded article with a surface skin according to a still further such an embodiment wherein, the reinforcing rib is integrally formed between the front wall and the back wall, and is a plate-shaped rib that projects the front wall or the back wall to be mutually welded at sides thereof.

A blow molded article with a surface skin according to even another such an embodiment wherein, the surface skin material is composed of a nonwoven fabric made of a synthetic fiber selected from the group consisting of polyesters, polypropylenes and polyamides, the nonwoven fabric having a mass per unit area weight not less than 100 g/m$^2$, and the surface skin material is integrally attached on at least one wall of the front wall and the back wall that constitute the plate-shaped body.

A blow molded article with a surface skin according to an even further such an embodiment wherein, the plate-shaped body is in a foamed state having a expansion ratio of 1.1 to 3.5 times.

A blow molded article with a surface skin according to still yet another such an embodiment wherein, the plate-shaped body is composed of two or more kinds of polyolefin resins having different melt flow rates, includes 3 to 10% by weight of an inorganic additive blended therein, and has a tensile modulus not less than 550 MPa (JIS K 7161).

A blow molded article with a surface skin according to a still yet further such an embodiment wherein, the plate-shaped body is formed to have a maximum thickness not more than 25.0 mm, and is used as an interior automotive trim of a cargo floor panel or a rear parcel shelf.

A method for producing a blow molded article with a surface skin, according an embodiment wherein a blow molded article comprises a plate-shaped body having a front wall and a back wall composed of a thermoplastic resin and a surface skin material attached on at least one wall of the front wall and the back wall, and that a single layered cylindrical parison or a plurality of resin sheets composed of a polyolefin resin including an foaming agent added therein is melt-extruded, or a preformed resin sheet is melted with heat to be arranged with a surface skin material between metallic split molds and to be clamped, thereby the plate-shaped body, in a foamed state, comprising bubble cells with an average particle diameter not more than 300 μm is molded, and simultaneously the surface skin material is integrally attached on at least one wall of the front wall and the back wall of the plate-shaped body.

A blow molded article with a surface skin according to another such an embodiment wherein, a polyolefin resin comprises a mixture of two or more kinds of polypropylene homopolymers having different melt flow rates at 230° C., the method using 3 to 10% by weight of talc blended as an inorganic additive, and a physically foaming agent comprising nitrogen.

The blow molded article with a surface skin according to one embodiment of the present invention can reduce rupture of bubble cells, by forming a plate-shaped body of a blow molded article with a surface skin in a foamed state comprising bubble cells with an average particle diameter not more than 300 μm, even in the case where the thermoplastic resin is maintained in a molten state at a temperature sufficient for integral attachment of a surface skin material in blow molding, and thereby a blow molded article with a surface skin can be formed while maintaining a required expansion ratio from the point of time of extruding process, leading to a blow molded article with a surface skin with lightweight and high bending rigidity.

DETAILED DESCRIPTION

Various embodiments of the present invention will be described in detail with reference to the accompanying drawings hereinafter.

Figure 1:
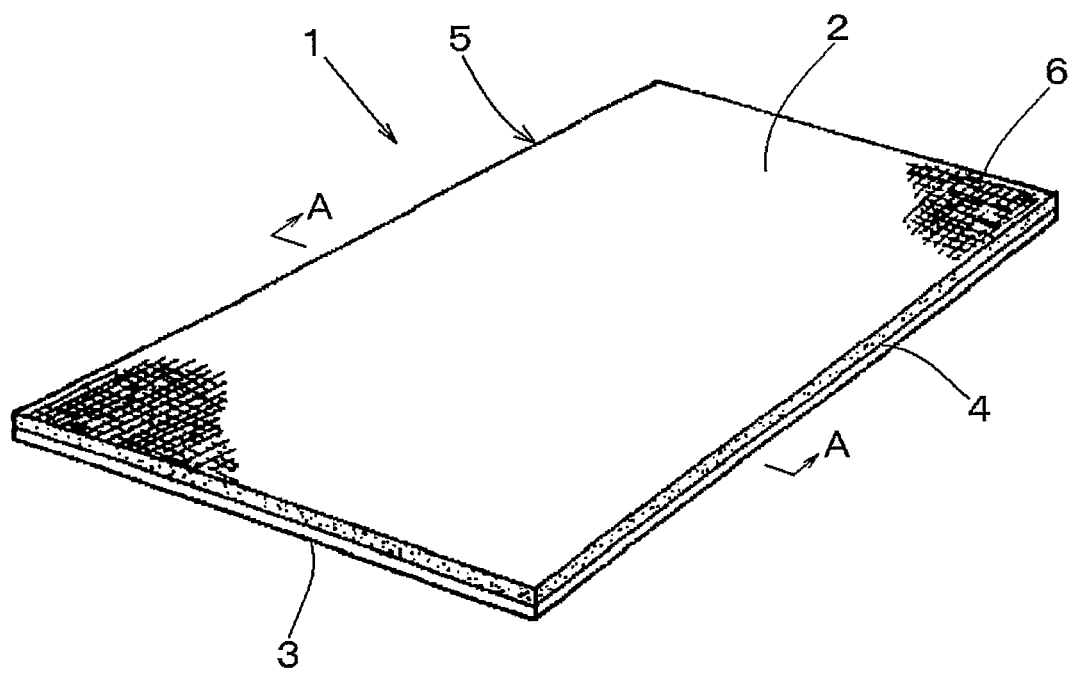
FIG. 1 is a perspective view illustrating a panel with a surface skin as a blow molded article with a surface skin according to one embodiment of the present invention.
Figure 2:
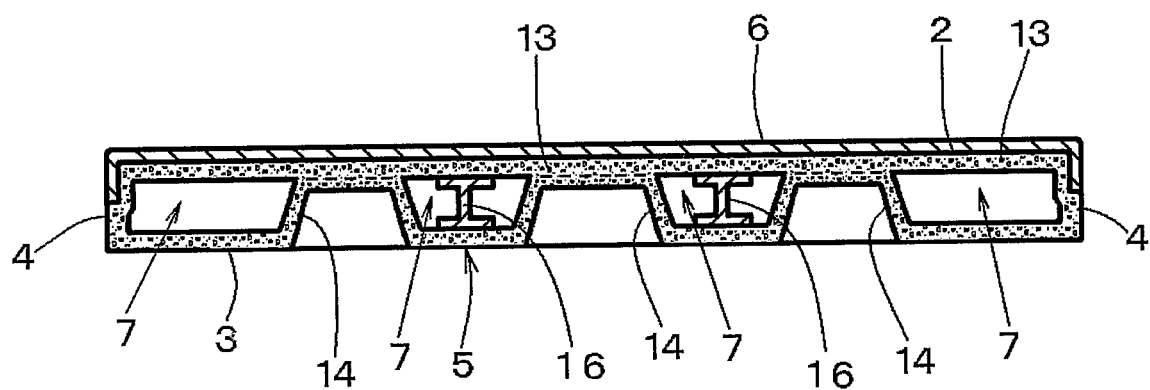
FIG. 2 is a sectional view taken along line A-A of FIG. 1.

FIGS. 1 and 2 illustrate a panel with a surface skin, which is a blow molded article with a surface skin according to one embodiment of the present invention. The panel 1 with a surface skin is composed of a plate-shaped body 5 having a hollow double-frame structure comprising a front wall 2, a back wall 3, and a side wall 4, and a surface skin material 6 integrally attached onto the outer surface of the front wall 2. Reference numeral 7 illustrates a hollow section.

The plate-shaped body 5 is formed into a foamed state including bubble cells with an average particle diameter not more than 300 μm. In order to provide the panel 1 with a surface skin having light weight and high rigidity, the plate-shaped body 5 is in one embodiment composed of a polyolefin resin, and may be provided in a foamed state exhibiting a expansion ratio in a range of 1.1 to 3.5 times.

A polypropylene resin or polyethylene resin may be used as the polyolefin resin that constitutes the plate-shaped body 5. In particular, suitably used is a blend of a propylene homopolymer having a long-chain branching structure and a propylene homopolymer having a linear structure, that have melt flow rates different from each other. One embodiment provides for the use of a propylene homopolymer having a linear structure in an amount not less than 50% by weight, specifically, in a range of 50 to 80% by weight in the blended polyolefin resin is used. Furthermore, the propylene homopolymer having a linear structure has a tensile modulus not less than 1100 MPa (JIS K 7161), and more specifically, not less than 1500 MPa, and it also has a melt flow rate (JIS K 7210) at 230° C. not more than 1.5 g/10 minutes, and more specifically, 0.5 g/10 minutes. Thereby, the melt flow rate (JIS K 7210) at 230° C. of the blended polyolefin resin is adjusted to a value not more than 1.8 g/10 minutes, and rupture of bubble cells can be reduced even in the case where the thermoplastic resin is maintained in a molten state at a temperature sufficient for integral attachment of the surface skin material 6 in blow molding, leading to a blow molded article with a surface skin exhibiting a high flexural strength.

In addition, the same effect may be expected in case of a propylene homopolymer having a long-chain branching structure containing not less than 50% by weight of a polyethylene resin having a melt flow rate at 190° C. not more than 1.5 g/10 minutes, and in one embodiment 0.3 g/10 minutes.

Figure 5:
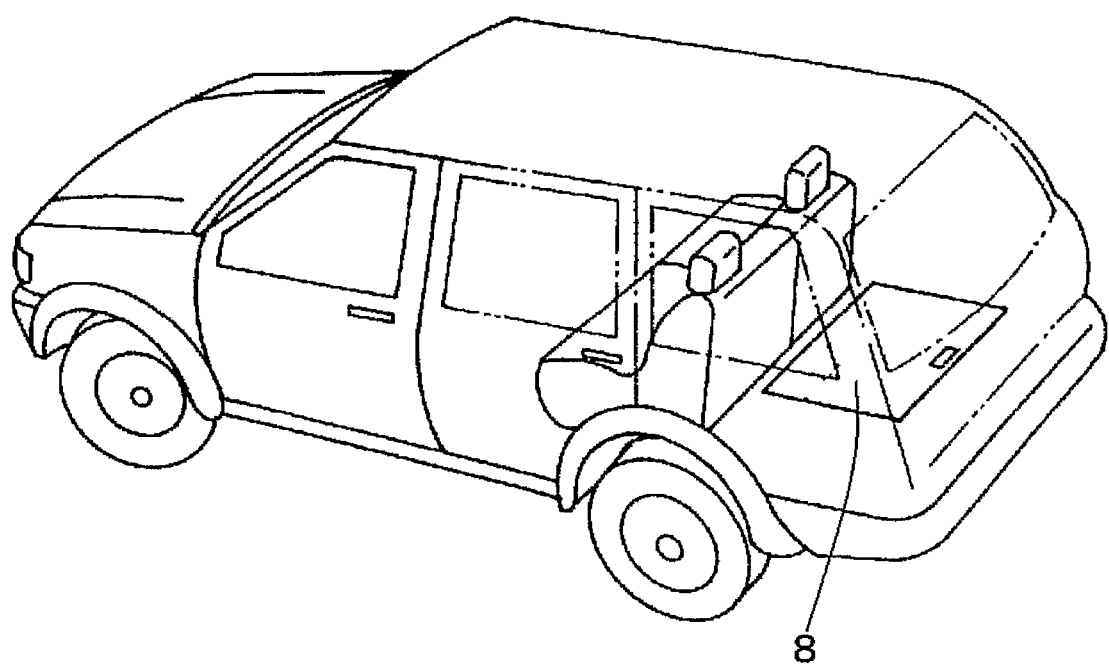
FIG. 5 is a perspective view illustrating an example wherein a panel with a surface skin as a blow molded article with a surface skin according to one embodiment of the present invention is used as a cargo floor panel of an automobile.
Figure 6:
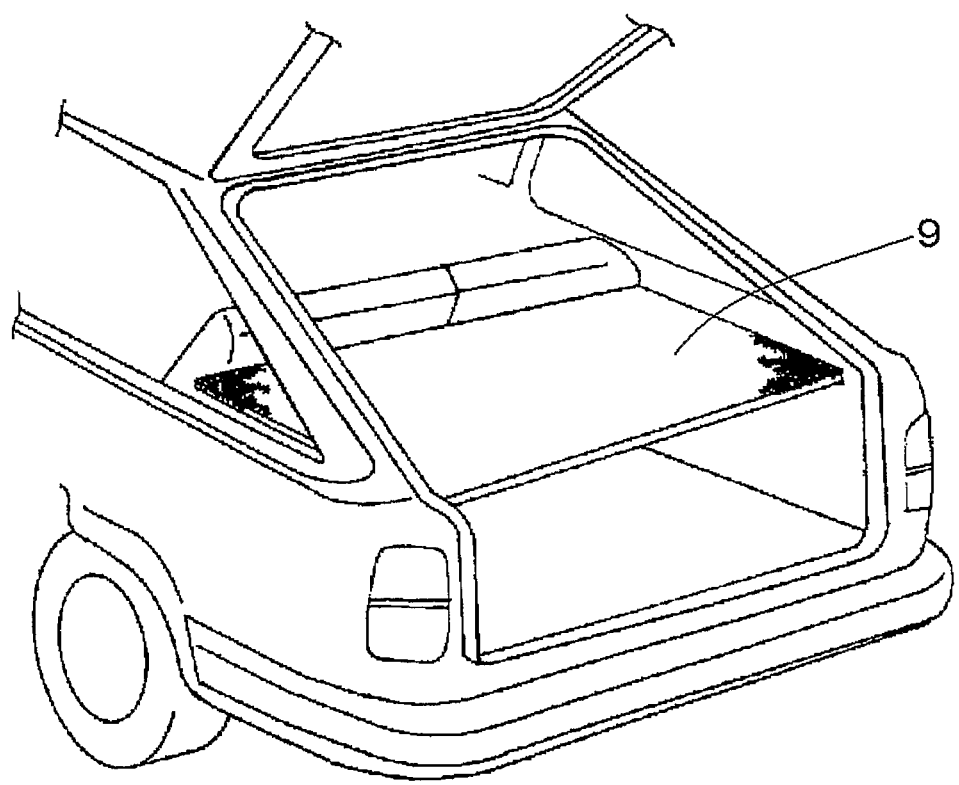
FIG. 6 is a perspective view illustrating an example wherein a panel with a surface skin as a blow molded article with a surface skin according to one embodiment of the present invention is used as a rear parcel shelf of an automobile.

As the thermoplastic resin that constitutes the plate-shaped body 5, a blend of 3 to 10% by weight, to the polyolefin resin, of SBS resin (styrene-butadiene-styrene), SEBS resin (styrene-ethylene-butadiene-styrene) or a mixture thereof can improve shock resistance. Thereby, even in the case of formation of the panel 1 with a surface skin using the plate-shaped body 5 in a foamed state, the panel 1 can be advantageously used especially as interior automotive trims, such as cargo floor panels 8 (lid panels of automobile luggage rooms or luggage boards) or rear parcel shelves 9 etc. (refer to FIGS. 5 and 6). When used as these interior automotive trims, inclusion of the bubble cells can advantageously exhibit sound-proofing function to noise, such as engine sound and heat insulating property to temperature rise caused by direct sunlight in luggage rooms and luggage boxes.

The temperature sufficient for integral attachment of the surface skin material 6 during melt extrusion or melting by heat of a cylindrical parison, a plurality of resin sheets, or a preformed resin sheet in order to form the plate-shaped body 5 in blow molding means a temperature, of the thermoplastic resin, that is needed for the cylindrical parison or the resin sheets of the thermoplastic resin in a molten state to contact the surface skin material arranged between split molds, to penetrate into gaps between fibers, such as nonwoven fabric, and to integrally fix therein due to an anchor effect. When the temperature of the thermoplastic resin is low, the flowability of the thermoplastic resin will be reduced, and adhesion strength with the surface skin material 6 will also be reduced, leading to problems such as peeling. Here, in case of the polyolefin resin, it is necessary that the temperature in extrusion in a molten state or the temperature at the time of overheated melting of the preformed resin sheet at the temperature sufficient for integral attachment of the surface skin material 6 in blow molding in general is set as a temperature not less than 185° C., and in one embodiment not less than 190° C.

The surface skin material 6 is obtained from fiber sheets, such as knitted fabrics, woven fabrics and nonwoven fabrics, obtained by processing natural fibers such as cotton, hemp, wool and silk; regenerated fibers such as viscose rayon and cuprammonium rayon; semi-synthetic fibers such as acetate and rayon; synthetic fibers such as nylon, polyester, acrylics, vinylon, polypropylene, and polyurethane; and blended fibers of the above mentioned fibers. The surface skin material 6, in one embodiment has raised fluffs perpendicularly extending outside with respect to the direction of spread of the material, by raising process and shearing process in design. The surface skin material may not have the fluffs. Furthermore, the surface skin materials may also be thermoplastic resin sheets made of, for example, vinyl chloride, polyethylene, polypropylene, and polyurethane. Fiber sheets, such as nonwoven fabrics, foamed sheets, publicly known backing materials, etc. can be laminated with respect to the resin sheet for improvement in cushioning properties, prevention of formation of air bubbles between the surface skin material and the parison, etc., and for improvement in attachment strength between the surface skin material and the parison, etc. Of the above described materials, nonwoven fabrics having a mass per unit area weight not less than 100 $g/m^2$ and composed of synthetic fibers including polyester, polypropylene, or polyamide may be beneficial in view of moldability.

As is illustrated in FIGS. 1 and 2, the surface skin material 6 is mainly attached on the front wall 2, in the front walls 2 and the back walls 3 that constitute the plate-shaped body 5. The entire surface may also be covered with the surface skin material so as to avoid exposure of the plate-shaped body by attaching the surface skin material composed of nonwoven fabrics etc., to both of the front wall and the back wall. At least one side of the surface skin materials here, attached on both sides of the front wall and the back wall, especially the surface skin material attached on the back wall can be a reinforcement sheet having a flexural modulus not less than 21000 $kg/cm^2$, and having a thickness not more than 1.0 mm, or a nonwoven fabric having a rupture strength not less than 90 $kg/m^2$. Reinforced resin sheets including inorganic reinforcing materials added therein, such as glass fibers and talc, and fiber reinforced sheets composed of glass fibers, carbon fibers, etc. are suitably used as a reinforcing sheet.

Figure 3:
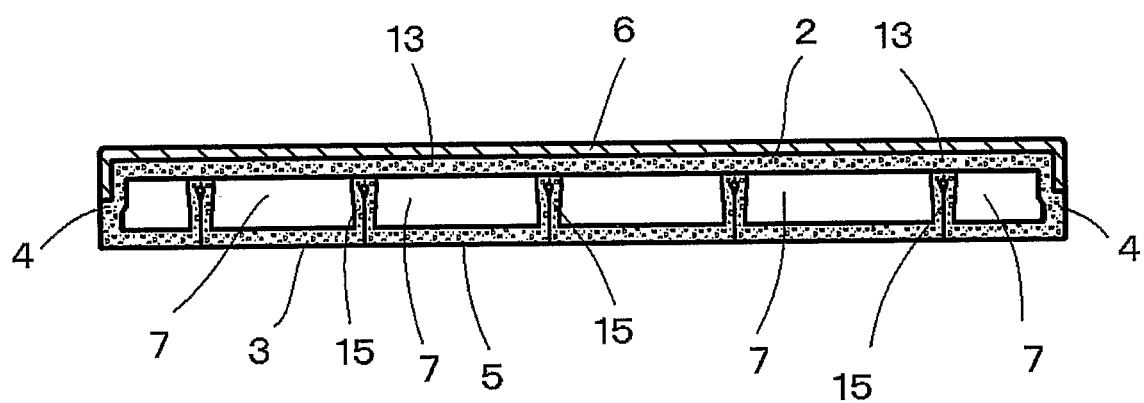
FIG. 3 is a sectional view illustrating another embodiment of the present invention.

In addition, as illustrated in FIGS. 2 and 3, parts of the front wall 2 and the back wall 3 are welded in the plate-shaped body 5 having a hollow double-walled structure, and the hollow section can be reinforced with the plate-shaped rib 15 having the side welded therein in a state where the two walls of projected portion are layered together especially by using a depressed rib 14 of a part of the back wall 3 projected to the front wall 2, or by projecting a part of the back wall 3 to the front wall 2 with a sliding mold and subsequently by removing the sliding mold. In addition, as illustrated in FIG. 2, insertion of a metal reinforcing core 16 into the hollow section 7 can improve rigidity and withstand-load function. Pipes with a cylindrical shape or with a rectangular shape etc. other than the reinforcing core 16 with a shape of H-steel as illustrated may in some embodiments be arranged along with a longitudinal direction of the panel with a surface skin.

Figure 4:
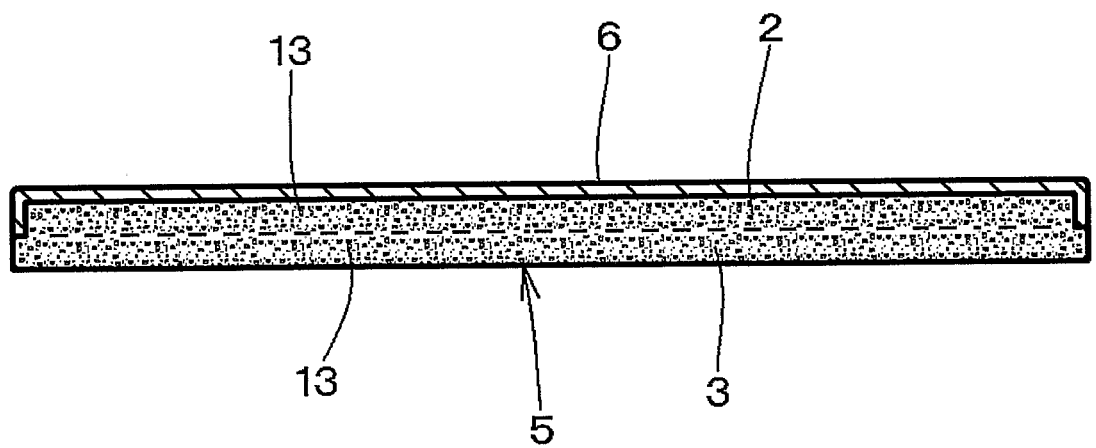
FIG. 4 is a sectional view illustrating still another embodiment of the present invention.

Furthermore, as illustrated in FIG. 4 as a partial sectional view of another embodiment, the entire or a part of the front wall 2 and the back wall 3 that constitute the plate-shaped body 5 may be integrally welded together. That is, the plate-shaped body 5 can be a front wall and a back wall having an integrated single layered structure without a hollow section between the front wall 2 and the back wall 3.

Figure 8:
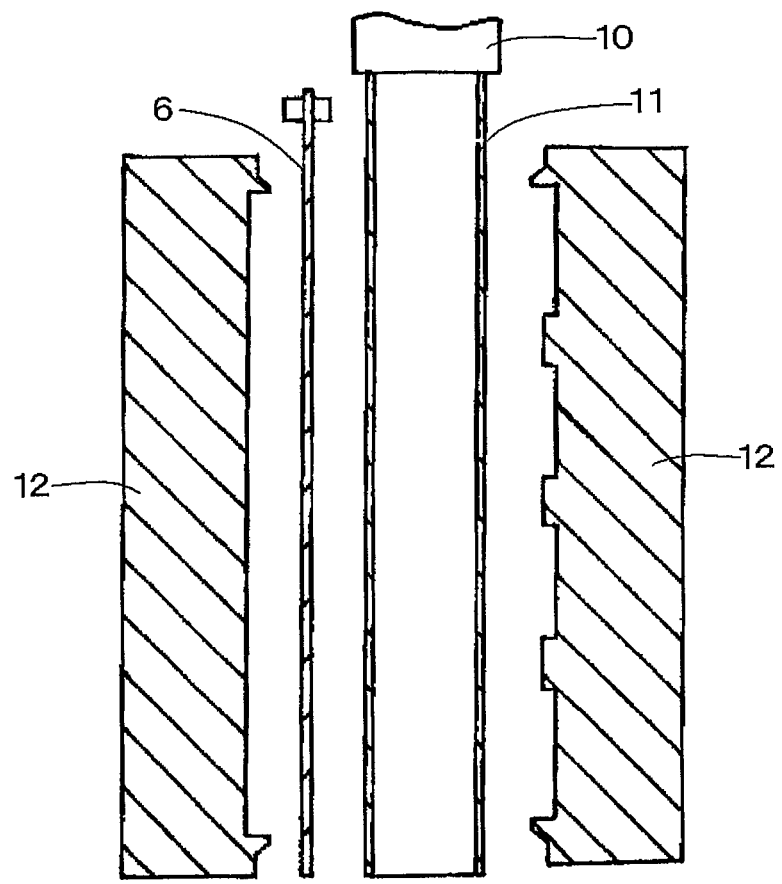
FIG. 8 is a sectional view illustrating a manner of a blow molding of a panel with a surface skin as a blow molded article with a surface skin according to one embodiment of the present invention.

As illustrated in FIG. 8, the panel 1 with a surface skin illustrated in FIGS. 1 and 2 may, in some embodiments be blow molded. That is, physical foaming agents such as carbon dioxide or nitrogen gas, or foaming agents such as publicly known chemical blowing agents are added from an extrusion head 10 into polyolefin resins such as polypropylenes, and kneaded. The obtained cylindrical parison 11, in a foamed state, which consists of one layer is melt-extruded at a high temperature not less than 185° C., and in some embodiments not less than 190° C. between the split molds 12 and 12 so as to be arranged with the surface skin material 6, and is clamped. Thus, the plate-shaped body 5, in a foamed state, comprising bubble cells with an average particle diameter not more than 300 μm is molded, and simultaneously the panel 1 having the surface skin material 6 attached integrally to the outer surface of the front wall 2 of the plate-shaped body 5 may be obtained. The parison 11 in a foamed state is melt-extruded at a high temperature not less than 185° C., and in some embodiments not less than 190° C. to form a pressurized fluid. The thus obtained pressurized fluid is introduced into the mold and is spread to follow the shape of the mold cavity, and thereby the plate-shaped body having 1.1 to 3.5 times of a desired expansion ratio may be formed, avoiding occurrence of rapid drop in expansion ratio by rupture of foams.

In one embodiment of the present invention, the blow molding is what is called a direct blow molding or a sheet blow molding, wherein as illustrated in FIG. 8, the cylindrical parison 11 or a plurality of resin sheets is/are melt-extruded or a preformed resin sheet is overheated and melted, and simultaneously arranged between the split molds 12 and 12, and then clamped, to mold in a desired shape. It is not limited whether blowing of air is accompanied or not.

Figure 7:
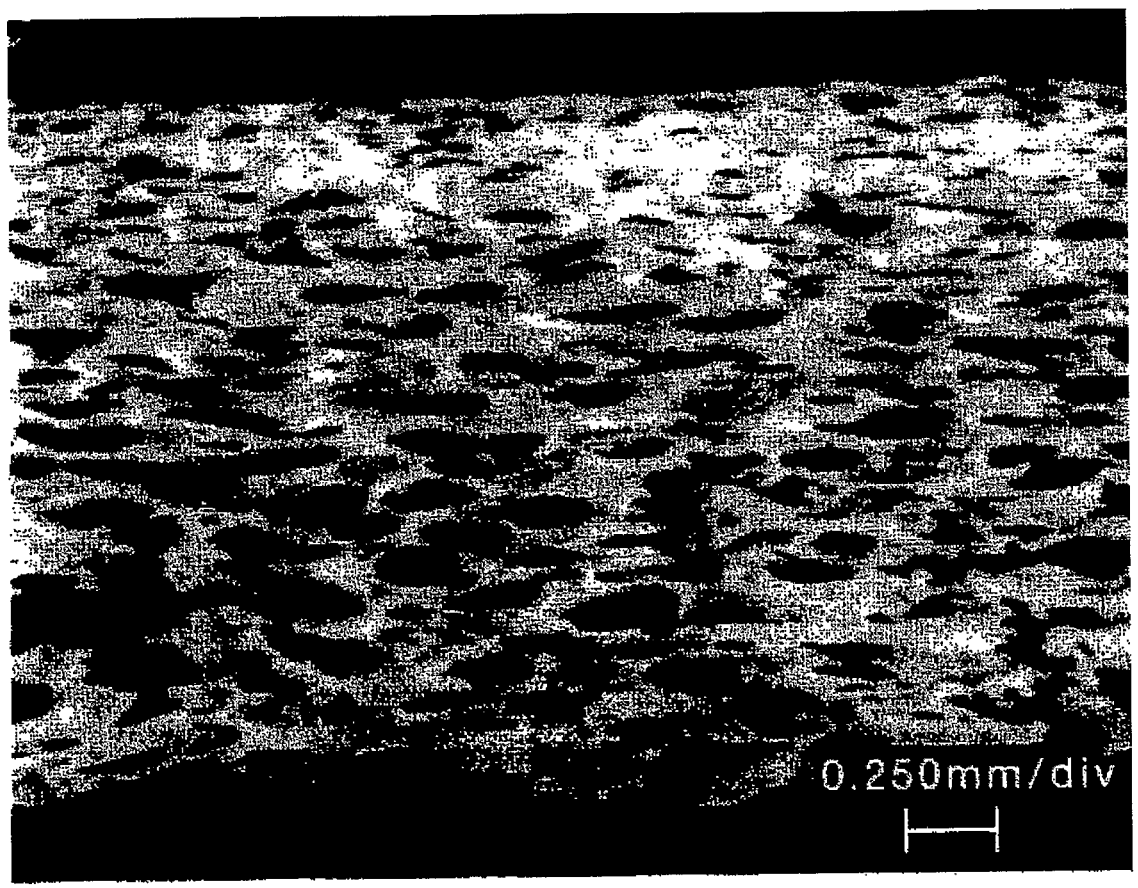
FIG. 7 is a sectional photograph of a wall of a plate-shaped body, wherein the black portion of approximate elliptical shape illustrates air bubbles.

A bubble cell 13 of the plate-shaped body 5 will ideally give a closed cell having an approximately globular form. However, since the bubble cell is extended along with the mold in the cylindrical parison 11 or the resin sheet in blow molding, the bubble cell is flat along the cavity plane of the mold, and gives a section approximately ellipse form (refer to FIG. 7). In one embodiment of the present invention, an average particle diameter of the bubble cell may be obtained by measurement of a width in a longer-axis direction of the section of the closed cell, and in open cell, it is measurable, also in open cells of the bubble cell, by the same method.

EXAMPLE 1

In formation of a plate-shaped body, a single layered cylindrical parison composed of a polyolefin resin was extruded by foaming blow molding. As the polyolefin resin, used was a mixture of 30% by weight of a propylene homopolymer "PF814" manufactured by Sun Alomar Inc. with melt flow rate 3.0 g/10 minutes (230° C.), and 70% by weight of a homopolymer "NOVATECH POLYPRO EA9BT" manufactured by Japan Polychem, Inc. with melt flow rate 0.5 g/10 minutes (230° C.). The melt flow rate of the mixture gave a value of 1.25 g/10 minutes (230° C.). As a foaming agent, added were 0.19% by weight of nitrogen gas as a physical foaming agent, and 5.2% by weight of talc as an inorganic additive in the above-described polyolefin resin, then kneaded, and subsequently a single layered cylindrical foamed parison was extruded. As a surface skin material, a nonwoven fabric having a mass per unit area weight of 350 g/m was placed between molds, and simultaneous integral molding was performed so that the nonwoven fabric were attached on the foamed parison.

According to the above described method, a panel with a surface skin with 500 mm in length×1000 mm in width (longitudinal direction)×25 mm in thickness was obtained. The plate-shaped body of the panel with the surface skin included bubbles with an average particle diameter of 150 μm, ant it gave a expansion ratio of 1.5 times and a tensile modulus of 600 MPa. Then, a plurality of plate-shaped ribs and metal reinforcing cores were arranged to the panel with the surface skin, and the panel was evaluated for a panel flexural strength by the following measurement of distortion.

A receptacle member having a width of 20 mm was positioned around the plate-shaped body, a weight of 30 kg was placed in an area equal to that of a circle with a diameter of 50 mm in the approximate center in a longitudinal direction of the plate-shaped body, and then an amount of distortion was measured. As a result, the amount of distortion in the central portion gave a value of 15 mm.

EXAMPLE 2

In formation of a plate-shaped body, a panel with a surface skin was molded in the same manner as in Example 1, except that a mixture of 30% by weight of a propylene homopolymer "PF814", manufactured by Sun Alomar Inc. with a melt flow rate 3.0 g/10 minute (230° C.), and 70% by weight of a propylene ethylene block copolymer "NOVATECH POLYPRO EC9", manufactured by Japan Polychem, Inc. with a melt flow rate 0.5 g/10 minute (230° C.) was used as the polyolefin resin. The plate-shaped body of the panel with the surface skin included bubbles with an average particle diameter of 240 μm, ant it gave a expansion ratio of 1.5 times and a tensile modulus of 350 MPa.

The plate-shaped body was evaluated for a panel flexural strength by measurement of distortion by the same method as that in Example 1. As a result, the amount of distortion in the central portion gave a value of 30 mm.

One embodiment of the present invention relates to a plate-shaped blow molded article with a surface skin in a foamed state, the article being produced by blow molding of a thermoplastic resin, and also relates to a method for producing the article.

The plate-shaped blow molded article with a surface skin according to one embodiment of the present invention may be used for, for example, interior automotive trims such as cargo floor panels (lid panels or luggage boards of automobile baggage compartments) or rear parcel shelves, and structural panel-shaped articles such as interior finishing wall partitions and doors.

The invention claimed is:

1. A method for producing a blow molded, single layered structure integrally welded two walls, thermoplastic article with a surface skin of non-woven material disposed on at least one wall of said article, said method comprising:
   arranging a surface skin material between split molds;
   providing within said split molds a cylindrical parison or plurality of resin sheets composed of a mixture of having different melt flow rates at 230° C. and a foaming agent;
   clamping said split molds;
   extruding said cylindrical parison or plurality of resin sheets at a temperature not less than 185° C. such that said cylindrical parison or resin sheets are in a molten state and come into contact with the surface skin material is integrally fixed to least one wall of said blow molded, plate shaped, thermoplastic article, such that said mixture polyolefin resins penetrates into gaps between fibers of said surface skin material and anchors said fibers to said polyolefin resin thereby integrally welding an entire surface of said at least one wall to said non-woven material,
   extending a bubble cell formed by said foaming agent within the mold in the cylindrical parison or the resin sheet, such that said bubble cell is flat along a cavity plane of the mold, and gives a section approximately ellipse form, producing a front wall and a back wall having an integrated single layered structure, in a foamed state, comprising bubble cells with an average particle diameter not more than 300 μm is molded; and
   allowing walls of said cylindrical parison or said resin sheets to integrally weld at an interior surface thereby forming a unitary foamed article.

2. A method for producing a blow molded, single layered structure integrally welded two walls, thermoplastic article with a surface skin of non-woven material disposed on at least one wall of said article, said method comprising:
   arranging a surface skin material having a resin layer between split molds;
   providing within said split molds a cylindrical parison or plurality of resin sheets composed of a mixture of resins having different melt flow rates at 230° C. and a foaming agent, such that said resin layer faces said parison or said plurality of resin sheets;
   clamping said split molds;
   extruding said cylindrical parison or plurality of resin sheets at a temperature not less than 185° C. such that said cylindrical parison or resin sheets are in a molten state and come into contact with the surface skin material is integrally fixed to least one wall of said blow molded, plate shaped, thermoplastic article, such that said mixture polyolefin resins penetrates into gaps between fibers of said surface skin material and anchors said fibers to said polyolefin resin thereby integrally welding an entire surface of said at least one wall to said non-woven material,
   extending a bubble cell formed by said foaming agent within the mold in the cylindrical parison or the resin sheet, such that said bubble cell is flat along a cavity plane of the mold, and gives a section approximately ellipse form, producing a front wall and a back wall having an integrated single layered structure, in a foamed state, comprising bubble cells with an average particle diameter not more than 300 μm is molded; and allowing walls of said cylindrical parison or said resin sheets to integrally weld at an interior surface thereby forming a unitary foamed article, such that a layer of resin is disposed between said unitary foamed article and said surface skin.

3. The method according to claim 1 wherein said temperature is not less than 190° C.

4. The method according to claim 2 wherein said temperature is not less than 190° C.

* * * * *